No. 656,718. Patented Aug. 28, 1900.
S. S. FLETCHER.
SHAFTING FOR MACHINERY.
(Application filed Oct. 2, 1899.)
(No Model.)
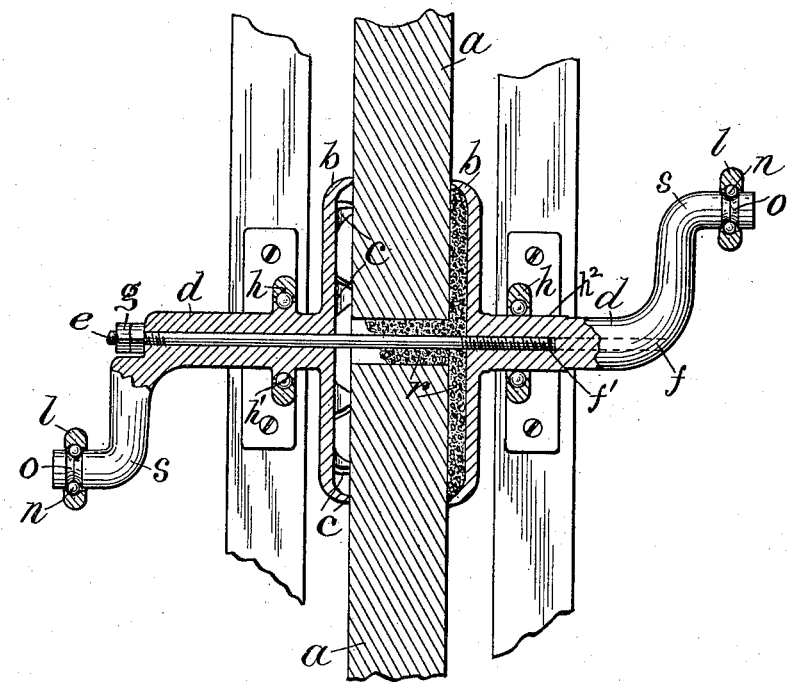

UNITED STATES PATENT OFFICE.

SIDNEY S. FLETCHER, OF CHICAGO, ILLINOIS, ASSIGNOR TO JAMES S. FLETCHER, OF SAME PLACE.

SHAFTING FOR MACHINERY.

SPECIFICATION forming part of Letters Patent No. 656,718, dated August 28, 1900.

Application filed October 2, 1899. Serial No. 732,284. (No model.)

*To all whom it may concern:*

Be it known that I, SIDNEY S. FLETCHER, a citizen of the United States, residing at Chicago, in the county of Cook and State of Illinois, have invented certain new and useful Improvements in Shafting for Machinery, which are fully set forth in the following specification, reference being had to the accompanying drawing, forming a part hereof, and which shows my said new device in plan view, partly in horizontal central section.

Like letters of reference denote like parts.

The object of my invention is to produce an improved shafting for certain kinds of machines by making the same in parts which will allow a better form and cheaper material and which also requires less manual and skilled labor to make the same useful. To attain said desirable ends, I construct my said improved shafting in substantially the following manner, namely: I make a cast-iron shaft $d$, preferably with an axial bore $f$, having at one end a transverse disk $b$, prefrably provided with spurs $c$, which rest against one side of a disk or pulley $a$ or like device and form a cement-space between said disk and pulley. It will be observed that it takes a pair of such shaft parts $d$ to make a completed shaft. It may at times be desirable to leave off the ball-runway $h'$ of one shaft part $d$ and in lieu thereof have a simple smooth enlarged cylindrical part $h^2$, on which ball-bearing balls run, and thereby permit more variation of position of its pillow-block $h$ and allow unobstructed expansion and contraction of the entire shaft and its supported pulley or other mechanism. An axially-central rod $e$, threaded at $f'$ and firmly screwed into one of said shaft parts in the bore $f$, passes through the other shaft part, where its outer end is provided with set-nuts $g$, which draw both shaft parts together and against the pulley $a$, whereby all said parts are clamped together. The disk or pulley $a$ is centrally bored to pass the rod $e$. In the drawing the central part of the part $a$ is much larger than the rod $e$ and illustrates the application of this shafting for a grindstone-mounting, in which case a self-hardening cement $r$ fills the central hole of the stone and the dished space between the parts $a$ and $b$, which after all the parts are properly adjusted hardens and holds them each unfailingly to place. In said latter application of the shaft treadle-cranks $s$ are cast integral with the outer end of each shaft part, and the outer end of each crank is provided with a circumferential groove or ball-runway $o$ to contain balls $n$, running in a groove $m$ on the interior of a ring $l$.

What I claim is—

1. The combination with independent shaft parts, each axially bored and provided with a disk and a crank, of an axial connecting-rod having means for fixedly connecting said shaft parts, substantially as specified.

2. The combination with axially-bored shaft parts, each provided with a shaft-bearing, a disk, and a crank, of an axial connecting-rod having means for fixedly connecting said shaft parts, substantially as specified.

3. The combination with independent, end-flanged, axially-bored and cranked shaft parts, of an axial rod, fixed at one end, in one of said shaft parts, having means to hold and adjust said parts together, substantially as specified.

4. The combination with a revoluble disk having an axial eye or opening, of end-flanged, cranked, shaft parts, each provided with a bearing, and means, reaching from flange to flange, to fixedly connect said shaft parts, substantially as specified.

5. The combination with a revoluble disk having an axial eye, of end-flanged, cranked, shaft parts, each provided with a bearing, a plastic, self-hardening material in said eye and to said disks, and means, reaching from flange to flange, to fixedly connect said shaft parts, substantially as specified.

SIDNEY S. FLETCHER.

Witnesses:
WM. ZIMMERMAN,
JAMES S. FLETCHER.